Nov. 30, 1937.   P. A. BORDEN   2,100,467
TELEMETERING SYSTEM
Filed Oct. 2, 1934   2 Sheets-Sheet 1
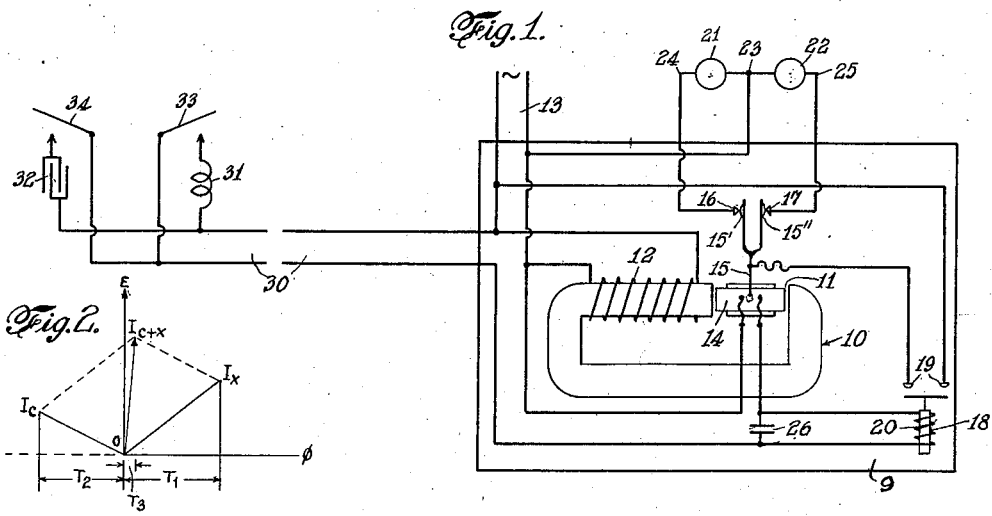
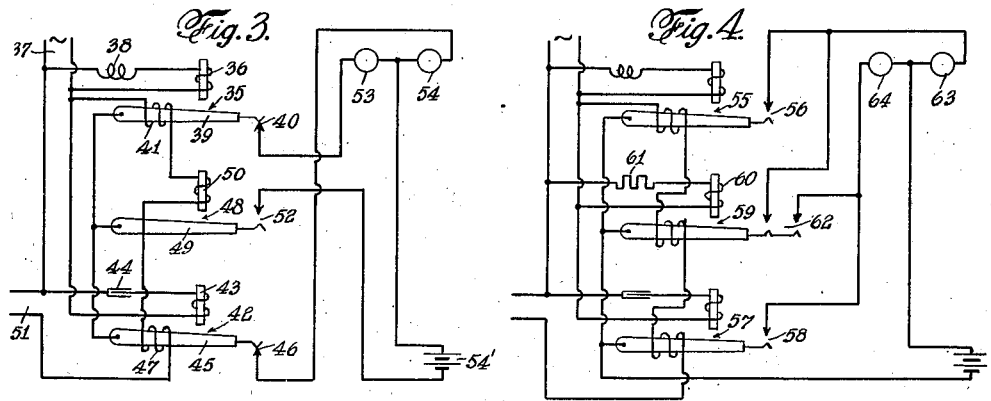
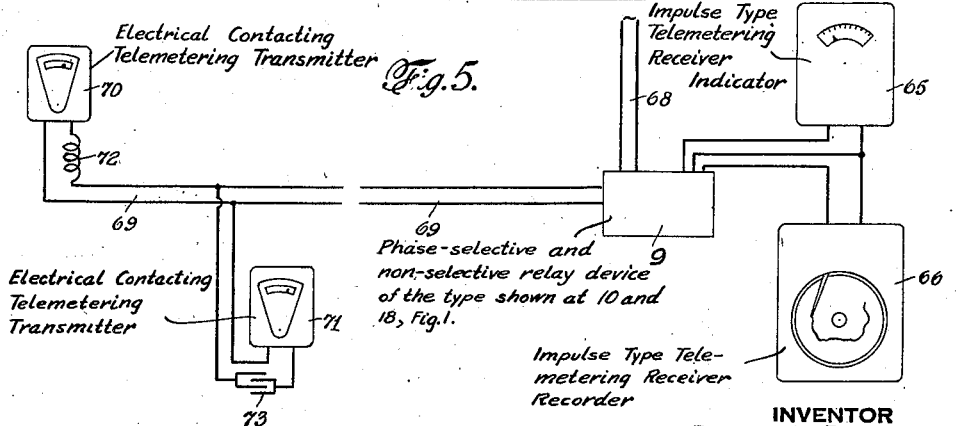
INVENTOR
PERRY A. BORDEN
BY
ATTORNEY Nov. 30, 1937.　　　P. A. BORDEN　　　2,100,467
TELEMETERING SYSTEM
Filed Oct. 2, 1934　　　2 Sheets—Sheet 2
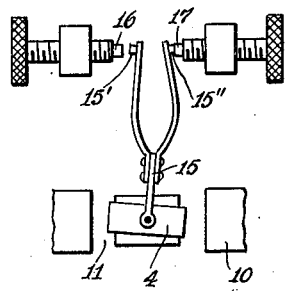
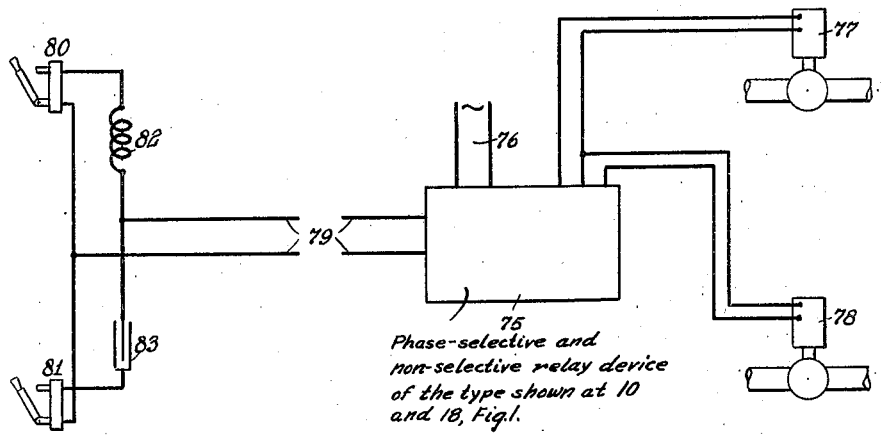
INVENTOR.
PERRY A. BORDEN
BY
ATTORNEY.

Patented Nov. 30, 1937

2,100,467

UNITED STATES PATENT OFFICE 2,100,467

TELEMETERING SYSTEM

Perry A. Borden, Waterbury, Conn., assignor to The Bristol Company, Waterbury, Conn., a corporation of Connecticut Application October 2, 1934, Serial No. 746,482

9 Claims. (Cl. 177—352)

This invention relates to remote metering and control systems operating electrically, and more particularly to that class of systems in which apparatus at the receiving end of an electrical circuit is made responsive to electrical impulses originating at a transmitting end of said circuit, such as in electrical telemetering and in the remote control of valves, switches and the like.

In telemetering or remote control systems of the above nature, the cost of the transmitting apparatus and the receiving apparatus is but little affected by the distance over which it is required that transmission take place; but the cost of the electrical connecting circuit will vary almost directly as the distance between the respective stations; and in systems of considerable length, the latter figure will become the dominating element in the cost of the installation. Where only a single set of impulses is to be transmitted, a two-conductor circuit will generally suffice; and the system may be said to be reduced to the minimum cost by the use of one or other of the several telemetering apparatus now known to the art. In practice, however, there arise many instances where it is required to transmit between two remotely situated stations impulses representative of a plurality of conditions, and where if a single connecting circuit can be made to carry the several sets of impulses representative of said plurality of conditions to be measured and/or controlled, the cost of the connecting lines, the dominating element in the cost of the installation, will be reduced to that of a single circuit, with a corresponding material reduction in the total cost of the installation.

A system whereby dissimilar impulses at a transmitting end of a two-conductor circuit may be caused to produce dissimilar results at a receiving end is set forth in U. S. Patent No. 1,971,764, issued to Borden and Hubbard, wherein the transmitting apparatus is made to produce in the circuit alternating currents which are leading or lagging, respectively, in regard to a reference voltage, and the receiving apparatus is made selective, and is adapted to respond differently according to the phase position of the transmitted current.

While it will be apparent to those skilled in the art that this principle may be applied to the actuation of independent devices or mechanisms, it will be further apparent that for effective operation of the system the leading and lagging current may not flow simultaneously in the connecting circuit, and that in the event of concurrent impulses from two transmitting members of the transmitting apparatus, the receiving apparatus would not function in a definite manner.

It is an object of the invention, therefore, to provide a system embodying means whereby a remote control operating on the "phase-angle" principle, as above set forth, may be had and which will be selective to a degree that, while one distinct effect is obtained with a leading current in the line and another distinct effect with a lagging current in the line, both effects will still be obtained independently with both currents flowing simultaneously in the line.

A further object of the invention resides in the provision of means whereby the above principle may be applied to telemetering systems of the "impulse" type, and in which two independent transmitting instruments may be caused to actuate without interference two independent receiving instruments, the whole transmission being effected through a two-conductor circuit.

In carrying out the invention, one or more phase-selective relays having a plurality of contacts for controlling corresponding local circuits in response to the phase-position of an alternating current, is associated with a non-selective relay adapted to be actuated in response to the flow of said current, there being an interconnecting circuit for the relay contacts. A two-conductor circuit is provided for supplying to said relays a common alternating current of a variable time-phase position, whereby there will be produced different relay contact combinations in response to different phase positions of said current.

The nature of the invention, however, will best be understood when described in connection with the accompanying drawings, in which:

Fig. 1 is a diagrammatic view setting forth the general arrangement of apparatus and circuits of the novel system comprising my invention.

Fig. 2 is a vector diagram illustrating the relationships existing among various alternating magnitudes in the system when in operation.

Figs. 3 and 4 are diagrammatic views illustrating modifications.

Fig. 5 is a diagrammatic view showing the application of the invention to a telemetering system of the impulse type.

Fig. 6 is a fragmentary detail elevation of the relay contact mechanism and illustrates its contact element deflected to one side, causing one of a pair of cooperating contacts to be opened.

Fig. 7 is a diagrammatic view illustrating a control system operated in accordance with the invention.

Referring to the drawings, there is mounted on the base 9 a relay 10 of the phase-selective type, similar to that set forth in the above-mentioned Patent No. 1,971,764 having in its magnetic circuit an air-gap 11, and being excited by a highly inductive electrical winding 12 which receives its energy from an A. C. supply 13. The flux traversing said electromagnetic circuit and air gap will thus be substantially in time-phase quadrature with the voltage of said A. C. source.

In the air-gap 11 of the magnetic circuit is pivoted a coil 14, oscillatable about an axis 14', adapted to carry electric currents and to be deflected thereby in an angular sense depending upon the phase relation existing between the flux in the air-gap 11 and the current in the coil 14, as hereinafter set forth. Furthermore, there is attached to the coil 14, and movable therewith, a contacting element 15 having two resiliently supported contact points 15' and 15" adapted to coact respectively with stationary contacts 16 and 17 of corresponding local circuits. With the coil 14 in its middle and normal position, both contacts 16 and 17 will, therefore, be simultaneously in engagement with the contacting points 15' and 15" of element 15; and, as the coil 14 deflects in one angular direction or the other, a corresponding circuit will be opened at one or the other of the contacts 16, 17. The relay 10 thus becomes a two-way circuit-opening phase-selective relay.

A further relay 18, having a pair of contacts 19 and an energizing coil 20, is mounted on the base 9 and is adapted to carry alternating current, the said contacts 19 being bridged upon the passage of such current in the coil 20, without regard to its phase position. Relay 18 is associated with the relay 10, as shown in Fig. 1, in such a manner as to effect the control, for example, of two signal lamps 21 and 22 of the respective local circuits and receiving current from a suitable source of supply (which may be the source 13 in common with the relay system, as shown, or may be an independent source) and connected to said source and to the relay contacts in the following manner: A common point 23 of the two lamps is connected to one side of the supply system, and their free terminals 24 and 25 to the contacts 16 and 17 respectively, the circuit being continued to the movable contact member 15 to the normally open contacts 19 of the relay 18 and through the same when bridged to the other side of the source of supply. Should the inductance of winding 20 exercise a disturbing effect, this may be obviated by paralleling said inductance with a condenser 26.

Thus it is to be noted that with the relay 10 in its neutral position, and no current in the coil 20 of the relay 18, while both the contacts 16 and 17 of relay 10 will be closed, yet, the contacts 19 being open, no current will flow in the lamps, and both will remain dark. If the contacts 19 be bridged, however, the relay 10 remaining undeflected, both contacts 16 and 17 will carry current, and both lamps 21 and 22 will be illuminated.

If the coil 14 of the relay 10 be also deflected, either the contact 16 or 17 will be separated from its corresponding contact point 15', 15" to interrupt the circuit to one or other of the lamps 21, 22; and, upon closing of the contacts 19 of the relay 18, only one of the lamps will be lighted, while the other remains dark. Thus it will be seen that four combinations of the lights 21 and 22 are possible, according to the relative deflections of the relays 10 and 18.

Actuation of the relays 10 and 18 is effected through a two-conductor transmisison circuit 30, having appreciable resistance and receiving power from the same A. C. source 13 as the winding 12 of the relay 10. This transmission circuit is arranged to have introduced selectively therein an inductance 31 and a capacitance 32, through either of which, or both in parallel, the circuit may be closed by independent switches 33 and 34. The transmission circuit is thereby completed through the coils 14 and 20 in series, so that upon closing of the switch 33 current will flow through these coils and through the inductance 31; and upon closing the switch 34 the circuit will be similarly completed through the capacitance 32. Moreover, upon closing of both switches simultaneously the circuit will be completed through the inductance and the capacitance in parallel.

The relations of the currents which will flow in the circuit 30 and in the coils of the relays, and the reactions produced thereby, will more readily be understood by reference to Fig. 2, wherein are shown vectors representative in their general relationship of the alternating magnitudes in the system.

From a reference point O, the vector E represents the voltage of the system, which is applied to the winding 12 of the relay 10, and also to the circuit 30 in series with the devices connected therein. By means of the high inductance of the winding 12, and other means well known to the art, the flux $\emptyset$ through the magnetic circuit and the air-gap 11 of the relay is caused to lag the voltage by an angle of substantially 90 degrees, as shown.

Upon the circuit being closed by the switch 33, and thus completed through the inductance 31, there will flow in the circuit a current $I_x$ tending to lag behind the voltage E, its actual magnitude and phase position relative to the voltage being determined by the value of inductance and resistance in the circuit. This current, flowing in the coil 14, will have a component in phase with the flux $\emptyset$, whereby there will be produced a torque $T_1$, tending to rotate the coil and parts carried thereby in a definite direction (say, clockwise), causing the circuit to be interrupted at the contact 16, and to remain closed at the contact 17. The current $I_x$, irrespective of its phase position, will actuate the non-selective relay 18, bridging its contacts 19, whereby a circuit will be completed through the light 22, causing the same to be illuminated.

Upon the line circuit being closed by the switch 34 instead of switch 33, and thus completed through the capacitance 32, there will flow in the line a current $I_c$, leading the voltage E. This current, also, will have a component which, flowing in the coil 14 of the relay 10, will produce a torque represented by $T_2$ and whereby the coil will tend to rotate in a direction opposite to that hereinabove set forth, opening the circuit at the contact 17 and maintaining it closed at the contact 16. The current $I_c$, actuating the non-selective relay 18, will cause the contacts 19 again to be bridged, whereby the light 21 will be illuminated.

In the event of both switches being closed at the same time, there will flow in the circuit a current $I_{c+x}$, which will be substantially the resultant of $I_c$ and $I_x$, occupying a time-phase position intermediate the two, and approaching a condition of being in phase with the voltage E. While this current may have a magnitude equivalent of that of the aforementioned out-of-phase currents, its reaction in the coil 14 on the flux $\phi$, as represented by T3, will be materially less; and, by adjustment of the characteristics of the circuit, may be brought to a negligible or zero value, so that the coil 14 will not be deflected thereby, and the local circuits will remain closed at contacts 16 and 17. The relay 18, however, being subject solely to the magnitude, and not to the phase-position, of the current, will be actuated as before, closing the circuit at contacts 19, and completing the circuit to lights 21 and 22, both of which will now be illuminated.

It will be apparent that even though the switches are not operated in unison, the respective relays 10 and 18 will at any time take relative positions representative of the relative positions of the switches, so that whatever switch combination is existent, a change in the arrangement will immediately be reflected in a corresponding change in the combination of the relays. Thus there has been provided a system whereby the signal lights 21 and 22 may be actuated independently or jointly through a two-conductor circuit. To those skilled in the art it will be evident that the lamps may be replaced, for example, by electromagnetic devices, such as valve motors and that the switches may be replaced by contacting controllers and like means, so that the principle of the invention may be applied to the remote control of two independent conditions over a single two-conductor circuit. For example, reference being had to Fig. 7 of the drawings, wherein the system is shown in its application to telemetering, the box 75 contains the essential combination of phase-selective and non-selective relays, as shown within the dotted rectangle in Fig. 1. The connections are such that upon alternating current of the proper fixed frequency being applied by the supply 76, one or other of the solenoid valves indicated at 77 and 78 will be energized, according to whether the two-conductor circuit 79 be completed through an inductance or through a capacitance. Should the circuit be completed through both simultaneously, both valves will be energized. At the transmitting end of circuit 79 are located two switches 80 and 81, which may be adapted for either manual or automatic operation to be connected to the line 79, through the inductance 82 and the capacitance 83, respectively. Thus, if the switch 80 be closed, the circuit will be completed through the inductance 82 and a lagging current will flow, which, acting in the relay mechanism within 67 will cause the solenoid valve 77 to be energized. Similarly, if the switch 81 be closed, the circuit will be completed through the capacitor 83 and a leading current will flow, and the solenoid valve 78 will be energized. Also, as above set forth, should both switches be closed, there will flow in the circuit 79 a current having a predominating in-phase component, with the result that, through the relay mechanism, both the solenoid valves will be simultaneously energized. Thus, a remote control of two electro-responsive devices, such as solenoid valves, may be effected through a two-conductor interconnecting circuit, without in any way departing from the principles involved in the application of the invention to "impulse" systems of telemetering.

In Fig. 3 is shown an alternative arrangement wherein the functions of response to lagging and leading currents are segregated in two independent relays. Relay 35, as indicated, includes an electromagnet 36, excited from a source of A. C. supply 37 through an inductance 38, and acting upon an iron armature 39 which carries one element of a normally closed contact pair 40. Surrounding the armature 39 is a coil 41 adapted to carry the current transmitted by the line. The relative polarities of the magnet 36 and the coil 41 are such that the armature 39 will be attracted by the magnet only when the coil 41 is carrying current having a substantial lagging component relative to the supply voltage.

A similar relay 42 includes an electromagnet 43, excited from the supply through a capacitance 44 and acting upon an iron armature 45 which carries an element of a normally closed contact 46, the armature being subject to polarization by a coil 47 adapted to carry the line current, relative polarities being such that the armature is attracted only when the current in the coil 47 has a substantial leading component relative to the supply voltage. It will be apparent that a selective action as above on the part of the two relays can also be obtained by furnishing both with leading, or both with lagging, current in the magnet coils, and adjusting the polarities of the polarizing coils accordingly.

A third relay 48 has an armature 49 subject only to the action of an electromagnet 50 which is directly excited by the line current and is connected in series with the coils 41 and 47 and with the transmitting line 51. This relay will then be non-selective, and will respond to current of proper magnitude in the line without regard to its phase position. The contacts 52 of this relay are normally open and will close whenever current flows in the line. Interconnection of the contacts to a pair of signal lamps 53 and 54 and to a source of current 54' is substantially as in Fig. 1; and it will be apparent that operation under different phase positions of line current will be equivalent to that already set forth. For example, assuming there to be flowing in the two-conductor circuit 51 a current having a substantial lagging component relative to the voltage across the A. C. supply 37, as would be obtained were the circuit 51 to be completed through an inductive winding; this current will flow through coils 41, 50 and 47 of the respective relays, and will act in the relay 35 to open contact 40 and in relay 48 to close contact 52. Relay 42, being responsive only to leading current, will remain inert, and contact 46 will remain closed. Thus, current from source 54' will pass through contacts 52 and 46, energizing the lamp or other electro-responsive device 54. In a similar manner, if the circuit 51 be completed through a capacitor causing a lagging current to flow, relay 42 will act and open contact 46; relay 48 will again respond and close contact 52, while relay 35 will be unaffected and contact 40 will remain closed. Under these conditions current from source 54' will flow through contacts 52 and 40 and energize the lamp or other electro-responsive device 53.

Again, assuming circuit 51 to be completed through an inductance and capacitance simultaneously, causing to flow in the circuit simultaneously a lagging and a leading current, the resultant of these (see Fig. 2) will possess a predominant component in phase with the voltage across 37; and, by proper proportioning of the inductance and capacitance relative to the fixed frequency of the circuit, the leading and lagging components of the resultant may be made to neutralize each other, whereby neither of the relays 35 and 45 will respond, the only response being that of relay 48, which, being non-phase-selective, will act and close contact 52. Current from the source 54' will then flow through contact 52 and both contacts 40 and 46, energizing both lamps 54 and 53. Thus, it will be seen that a selective combination has been established and that the lamps 54 and 53 (or any electro-responsive devices by which they may be replaced) will respond either singly or jointly, according to whether the two-conductor circuit 51 is completed through an inductance, a capacitance, or both simultaneously.

A further alternative is shown in Fig. 4, wherein the function of response to in-phase current is centered in a relay distinctly separate from those which respond to the respective out-of-phase currents. Relay 55 is identical in its operating arrangement with relay 35 of the arrangement shown in Fig. 3, and under the influence of a lagging current acts to close normally open contacts 56. Relay 57 is identical with relay 42 of the former arrangement, and under the influence of leading current acts to close normally open contacts 58. A third relay 59, identical in structure with relays 55 and 57, has its magnet coil 60 excited by current through a resistor 61, so that it responds only to current having a substantial in-phase component, and acts to close a double contact 62. Two signal lamps 63 and 64 are provided and connected to the contacts 56, 58 and 62 in such a manner that lamp 63 will be energized by contacts 56 of relay 55, and lamp 64 by contacts 58 of relay 57, and both will be energized by the double contact 62 of relay 59.

It will be apparent that a line current having a predominating lagging component may be caused to actuate only relay 55 and illuminate lamp 63, while a current having a predominating leading component may be caused to actuate only the relay 57 and cause thereby illumination of the lamp 64, while a current having a substantial in-phase component, as would result from a combination of the two, may be caused to actuate only the relay 59, thus illuminating both lamps 63 and 64.

Other expedients will suggest themselves to those skilled in the art, and I do not wish to be restricted to the specific embodiments herein shown and described.

In Fig. 5 is shown an application of the invention, as hereinabove described, to a remote metering or telemetering system of the impulse type; and this system may be of the class in which the magnitude of the condition whose measurements are to be transmitted is represented by the frequency of occurrence of distinct electrical impulses, as in Patents #1,610,625 to Smith and #1,633,973 to Borden, or of the class in which the magnitude is represented by the time relation of variably spaced short impulses to uniformly spaced impulses, as in Patent #1,597,828 to Roucka, or of the class in which the measured magnitude is represented by the time duration of cyclically recurrent impulses as in Reissue #19,039 to Wilde. The particular application of the invention as indicated in Fig. 5 is to a system of the last-named type. Thus, 65 and 66 designate receiving instruments suited for actuation by impulses whose respective durations in successive recurrent cycles are representative of a condition whose magnitude it is desired to record, as in the above-mentioned Wilde patent, or in Patent 2,040,918 granted May 19, 1936, to applicant's assignee. The instrument 65 is shown as an indicator and the instrument 66 as a recorder, and both receive current from a relay system represented at 9, similar in all respects to the combination of relays 10 and 18 of the embodiment illustrated in Fig. 1. This relay system has associated therewith an A. C. supply 68 and a two-conductor transmitting circuit 69, the internal connections and adjustments being such that a current in the circuit 69, having a substantial lagging component relative to the voltage of the supply, will cause the instrument 65 to be energized, while a leading current in the circuit will similarly cause the instrument 66 to be energized as hereinabove set forth.

At a location or locations on the line 69 remote from the instruments 65 and 66 and the relay system 9, are placed transmitting units 70 and 71, adapted to perform quantitative measurement on variable conditions and to translate the magnitudes of said conditions into cyclically recurrent closings and openings of electrical contacts, the durations of time intervals so defined being representative of the then magnitudes of said conditions, and as is more fully disclosed in the Wilde patent and Bristol application. Transmitter 70 is connected to the transmission circuit in series with an inductance 72, and transmitter 71 with a capacitance 73.

Thus it will be seen that, when the circuit is closed by transmitter 70, for example, a lagging current will flow in the line 69, actuating receiving instrument 65; and, when the circuit is closed by transmitter 71, a leading current will flow, causing instrument 66 to be actuated; and, when transmitters 70 and 71 both close the circuit simultaneously or concurrently, both of the receiving instruments will be actuated. There has, therefore, been provided means whereby each of the receiving instruments will be actuated by its corresponding transmitting instrument, and in a manner that, though the only connection between the two pairs of instruments is through a two-conductor circuit, there will be no interference in the operation of the two telemetering systems.

I claim:

1. In combination: a phase-selective relay means connected to a source of alternating current and provided with a plurality of normally closed contacts having a conductor common thereto, said contacts being opened alternatively in response to the phase position of the alternating current in an electro-responsive element of the relay means, a non-selective relay having an actuating winding and normally open electrical contacts adapted to be closed in response to the flow of alternating current through the winding of said non-selective relay regardless of phase position, an interconnecting circuit connecting the last-named contacts to the common conductor of said first-named contacts, and a two-conductor control circuit connected at one end with the electro-responsive element of the phase-sensitive relay means and to the winding of the non-selective relay means, and means at the other end of the said two-conductor control circuit for determining the time-phase position of the current therein to produce different contact combinations by the interaction of the said non-selective relay means and the said phase-selective relay means.

2. In combination: a source of alternating current, a two-conductor control circuit energized from said source, means at one end of said circuit to alter the phase-angle characteristic thereof, a plurality of electro-responsive means located at the opposite end of the control circuit and including circuit-controlling means actuated thereby, a plurality of circuits controlled by the said circuit-controlling means, the latter being interconnected and the electro-responsive means being also interconnected and included in the control circuit and having contact members to afford diverse combinations of said circuit-controlling means, one of said combinations corresponding to a condition of leading current in the control circuit, another to a condition of lagging current in the control circuit, another to a condition of current having a substantial in-phase component, and still another to a condition in which no alternating current is flowing in said circuit, together with current-responsive means included respectively in the said circuits controlled by the electro-responsive means.

3. In combination: a phase-selective relay means connected to a source of alternating current and provided with a plurality of normally closed contacts having a conductor common thereto, said contacts being opened alternatively in response to the phase position of the alternating current in an electro-responsive element of the relay means, a non-selective relay having an actuating winding in series with the electro-responsive element of the phase-selective relay, local circuits and instrumentalities controlled by said phase-selective relay contacts and energized through the operation of the said non-selective relay, and a two-conductor control circuit connected at one end with the electro-responsive element of the phase-selective relay means and to the winding of the non-selective relay means, and a plurality of means at the other end of the said two-conductor control circuit adapted to be bridged across said control circuit for introducing different impedances therein to control the time-phase position of the current in said two-conductor control circuit.

4. In combination: a phase-selective relay means connected to a source of alternating current and provided with a plurality of normally closed contacts having a conductor common thereto, said contacts being opened alternatively in response to the phase position of the alternating current in an electro-responsive element of the relay means, a non-selective relay having an actuating winding and a normally open electrical contact adapted to be closed in response to the flow of alternating current through the winding of said non-selective relay regardless of phase position, an interconnecting circuit connecting the last-named contact to the common conductor of said first-named contacts, and a two-conductor control circuit connected with the electro-responsive element of the phase-selective relay means and to the winding of the non-selective relay means, and means for controlling the time-phase position of the current in said two-conductor control circuit to produce different contact combinations by the interaction of the said non-selective relay means and the said phase-selective relay means.

5. In combination: a phase-selective relay means connected to a source of alternating current and having a phase-responsive element adapted to respond directionally in accordance with the phase position, relative to the source of alternating current, of a current therein, and having two normally closed contacts adapted to be opened alternatively according to the directional response of said element, electric circuits independently controlled by said contacts, means to energize said circuits, a non-selective relay having an actuating winding and a normally open electrical contact adapted to be closed in response to the flow of alternating current through the winding of said non-selective relay regardless of phase position, the contact being included in circuit with the said energizing means for the independently controlled circuits to interrupt normally energization of both circuits and to permit energization thereof only when the windings of said non-selective relay means is energized, a two-conductor control circuit connected at one end with the phase-responsive element of the phase-selective relay means and to the winding of the non-selective relay means, and means at the other end of the said two-conductor control circuit for determining the time-phase position of the current therein to produce different contact combinations by the interaction of the said non-selective relay means and the said phase-selective relay means.

6. In an electrical remote control system: the combination of a plurality of receiving instruments, a single source of alternating current, phase-selective relay means having windings connected to said source and contacts connected to the receiving instruments whereby to render the latter responsive alternatively as the alternating current supplied to the relay means differs in phase relative to the voltage of said source, a plurality of transmitting instruments corresponding respectively to the said receiving instruments and adapted to control either alternately or concurrently impulses of the alternating current derived from said source and differing in phase position correspondingly to the impedance characteristics of the respective instruments, and a two-conductor circuit connecting said transmitting instruments to the said relay means, whereby each receiving instrument controlled thereby may be made respectively responsive to its respective transmitting instrument.

7. In an electrical remote control system: the combination of a plurality of receiving instruments, a plurality of corresponding transmitting instruments having contacts to complete electrical circuits including means affording to the respective circuits different phase-angle characteristics, a two-conductor transmission line between the transmitting and receiving instruments, relay means connected with the said receiving instruments and embodying phase-selective and non-selective elements whereby each may be made respectively responsive to its corresponding transmitting instrument, and a single source of alternating current for energizing the relay means through said transmission line.

8. In an electrical remote control system: the combination of a plurality of receiving instruments, a plurality of corresponding transmitting instruments adapted to complete electrical circuits having different phase-angle characteristics, a two-conductor transmission line between the transmitting and receiving instruments, relay means connected with the said receiving instruments and embodying phase-selective and non-selective elements whereby each may be made respectively responsive to its corresponding transmitting instrument, and a single source of alternating current for the entire system and located at the receiving instrument end, connected to the relay means and to the said transmission line.

9. In an electrical remote control system: the combination of a plurality of receiving devices, a single source of alternating current, relay means including phase-selective and non-phase-selective elements and having windings connected to said source and contacts connected to the receiving devices whereby to render the latter selectively responsive in accordance with operative combinations of said elements as the alternating current supplied to the relay means differs in phase position relative to the voltage of said source, a plurality of transmitting devices corresponding respectively to the said receiving devices and embodying circuit-controlling means adapted to control either alternately or concurrently in the several transmitting devices alternating currents derived from said single source but differing in phase position corresponding to impedance characteristics of the respective transmitting units, and a two-conductor circuit connecting said transmitting devices to the said relay means, whereby each receiving device connected thereto may be made responsive to its respective transmitting device independently of any other transmitting device.

PERRY A. BORDEN.